US008990778B1

(12) United States Patent
Allocca et al.

(10) Patent No.: US 8,990,778 B1
(45) Date of Patent: Mar. 24, 2015

(54) SHADOW TEST REPLAY SERVICE

(75) Inventors: William W. Allocca, Bellevue, WA (US); James Cade Bodley, Seattle, WA (US); Ram Cherukuri, Bellevue, WA (US); Bharathi Masilamani, Seattle, WA (US); Harsha Ramalingam, Kirkland, WA (US); Nandan U. Telang, Newcastle, WA (US)

(73) Assignee: Amazon Technologies, Inc., Reno, NV (US)

( * ) Notice: Subject to any disclaimer, the term of this patent is extended or adjusted under 35 U.S.C. 154(b) by 218 days.

(21) Appl. No.: 13/619,197

(22) Filed: Sep. 14, 2012

(51) Int. Cl.
*G06F 9/44* (2006.01)
*G06F 11/36* (2006.01)

(52) U.S. Cl.
CPC .................................. *G06F 11/3692* (2013.01)
USPC .......................................................... 717/126

(58) Field of Classification Search
None
See application file for complete search history.

(56) References Cited

U.S. PATENT DOCUMENTS

| | | | | |
|---|---|---|---|---|
| 7,882,496 | B2 * | 2/2011 | Cognigni et al. | 717/126 |
| 7,954,090 | B1 * | 5/2011 | Qureshi et al. | 717/127 |
| 8,015,549 | B2 * | 9/2011 | Cooper et al. | 717/124 |
| 8,327,334 | B2 * | 12/2012 | Chockler et al. | 717/127 |
| 8,826,239 | B2 * | 9/2014 | Sawano | 717/126 |
| 8,832,657 | B1 * | 9/2014 | Cowan et al. | 717/124 |
| 2006/0129988 | A1 * | 6/2006 | Calsyn et al. | 717/124 |
| 2008/0229284 | A1 * | 9/2008 | Castro et al. | 717/124 |
| 2008/0282233 | A1 * | 11/2008 | Sheppard | 717/127 |
| 2011/0145790 | A1 * | 6/2011 | Rajaraman et al. | 717/124 |
| 2011/0145795 | A1 * | 6/2011 | Khanapurkar et al. | 717/126 |
| 2011/0173591 | A1 * | 7/2011 | Prasad | 717/126 |
| 2011/0231822 | A1 * | 9/2011 | Sabin et al. | 717/124 |
| 2012/0084753 | A1 * | 4/2012 | Maybee et al. | 717/124 |

OTHER PUBLICATIONS

Orso et al., "Gamma system: continuous evolution of software after deployment," 2002, Proceedings of the 2002 ACM SIGSOFT international symposium on Software testing and analysis, pp. 65-69.*
Crameri et al., "Staged deployment in mirage, an integrated software upgrade testing and distribution system," 2007, Proceedings of twenty-first ACM SIGOPS symposium on Operating systems principles, pp. 221-236.*
Brodovsky et al., "A/B Testing at SweetIM: the Importance of Proper Statistical Analysis," 2011, 11th IEEE International Conference on Data Mining Workshops, pp. 733-740.*

* cited by examiner

*Primary Examiner* — Thuy Dao
*Assistant Examiner* — Stephen Berman
(74) *Attorney, Agent, or Firm* — Lee & Hayes, PLLC

(57) ABSTRACT

The techniques described herein provide software testing of a candidate version of software. In some examples, an interceptor intercepts at least one production request to a production version of the software and issues the production request to a shadow proxy service as a shadow request. The shadow proxy service causes the at least one shadow request to be processed by the candidate version of the software being validated and an authority version of the software being used to validate the candidate version. The shadow proxy service may then compare and/or analyze at least one candidate response to the shadow request from the candidate version and at least one authority response to the shadow request from the authority version. A dashboard service may provide at least some of the resulting information and issue a request the shadow proxy service to replay at least one of the shadow requests.

28 Claims, 7 Drawing Sheets

SHADOW TEST REPLAY SERVICE

BACKGROUND

Software architects often engage in a process of improving software after deployment of the software. The improvements may be implemented by modifying a version of the software or by creating a new version of the software, where the modified or new version of the software is intended to replace the deployed (current) version of the software. Deployment of the modified or the new version of the software may have an impact on hardware that supports the version of the software (e.g., require more or less processing power and/or time), may impact outcomes resulting from user interaction (e.g., satisfy, annoy, or frustrate users, etc.), or may have other possible outcomes (e.g., include bugs, etc.). Therefore, it is desirable to perform a comparison test, often called A/B testing, to compare results following execution of the modified or new version of the software against results following execution of the deployed (current) version of the software prior to a full deployment of the modified or new version of the software.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed in part to software testing that may process a production request using a production (or "live") version of software and a shadow request, which is based on the production request, using a shadow proxy service operating at least a candidate version of the software (e.g., trial or test version, etc.). The production version of software, unlike the candidate version, may update production system data and may transmit data back to the end users while the shadow request does not output to the users and/or affect the production system. In contrast to typical A/B testing, the testing of the candidate version occurs without updating production system data and thus is used primarily to test system functionality and performance when executing sample requests (shadow requests) that are based on actual requests (processed with the production version of the software).

In some implementations, an interceptor module may use sampling rules to intercept production requests and initiate shadow requests to the shadow proxy service based on various factors, rules or logic. Thus, not all production requests may be issued as shadow requests. As each shadow request is received and processed by the shadow proxy service, the shadow proxy service system analyzes the result of the candidate version of the software (such as by comparing the candidate request result to the result of the production version of the software). The shadow proxy service system may then derive metrics and log data about the shadow testing on a request-by-request or aggregate basis. Some or all of the data may then be presented via a dashboard service. The dashboard service may be used to replay one or more shadow requests for various purposes, such as to replay the request to the candidate version of the software after a code change or patch has been applied.

The techniques and systems described herein may be implemented in a number of ways. Example implementations are provided below with reference to the following figures.

Illustrative Environment

Figure 1:
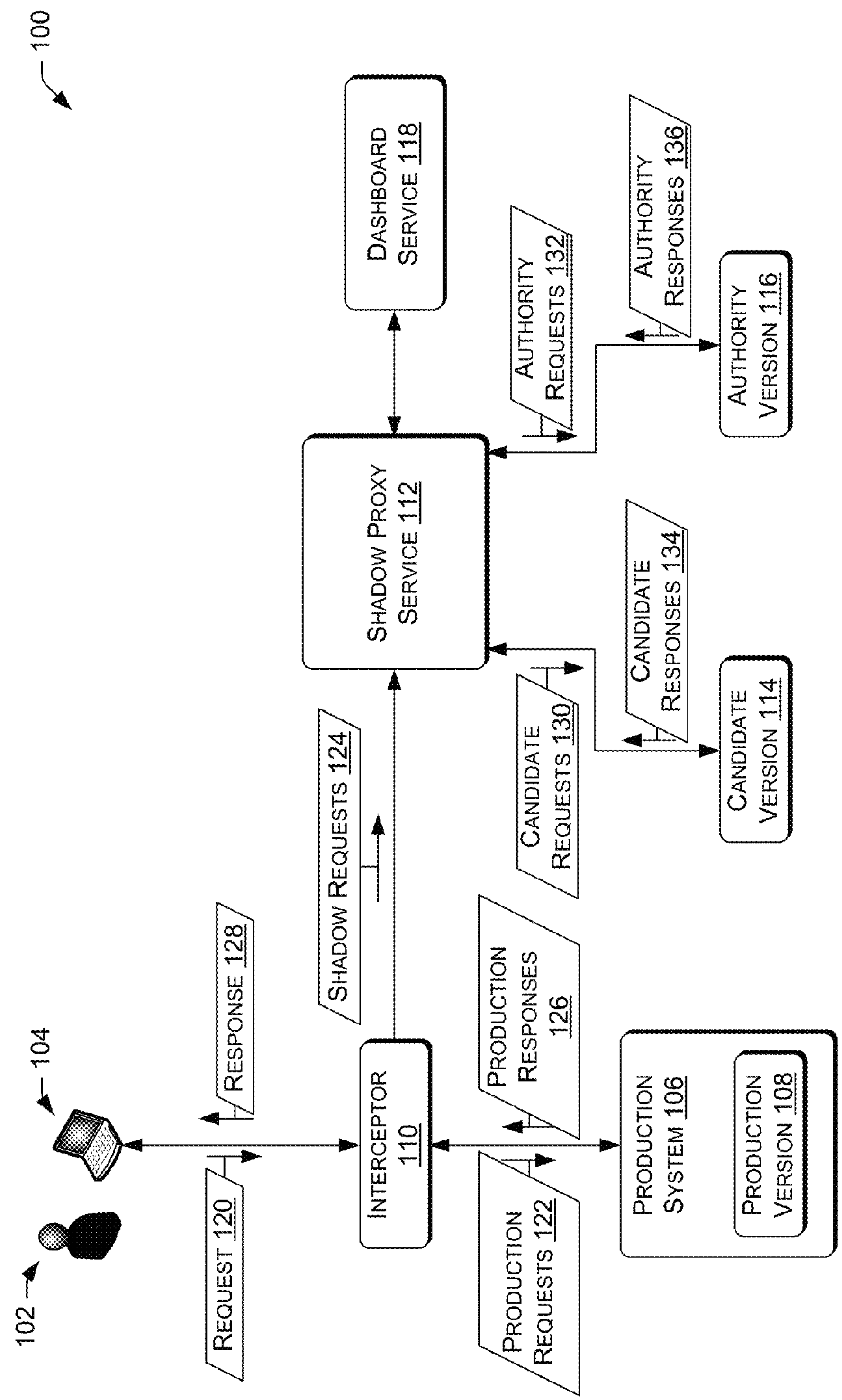
FIG. 1 is a schematic diagram of an illustrative environment that provides software testing of one or more versions of software using shadow requests.

FIG. 1 is a schematic diagram of an illustrative environment 100 that provides software testing of one or more versions of candidate software using shadow requests. As shown in FIG. 1, the illustrative environment includes a user 102 operating a user device 104, a production system 106 operating a production version 108 of software, an interceptor 110, a shadow proxy service 112 operating a candidate version 114 and an authority version 116 of the software, and a dashboard service 118. While shown as stand-alone items, one of ordinary skill in the art would understand that the candidate version 114 and authority version 116 of the software are operated by system resources, such as shadow proxy service system resources, production system resources or other system resources. These system resources may be computing devices, distributed or non-distributed computing services, server farm(s) or other types of resources that can execute the various versions of the software. FIG. 1 also illustrates an exemplary shadow proxy service system which, in the implementation shown in FIG. 1, includes the interceptor 110, the shadow proxy service 112, and the dashboard service 118. In some implementations, the shadow proxy service system may comprise a shadow test framework. In some such implementations, the shadow test framework may be exposed as a web service for external clients.

In operation, the user 102 (e.g., a downstream consumer or user) may, using a user device 104, transmit a request 120 for electronic data from the production system 106. However, in some implementations, the request 120 may be a request generated by another service, the production system 106, or another process, and may not be a human-generated request. The production system 106 may be part of an electronic marketplace, an electronic financial service, a messaging service, a social network, and/or any other service that exchanges electronic data with users. The production system 106 may operate various versions of software that are executable in a framework and processed by production system resources. The versions may include the production version 108 of software that is currently deployed to fulfill user requests, such as request 120.

The interceptor 110 intercepts at least some requests sent to the production system 106, such as the request 120, and forwards (or publishes) the requests to the production system 106 as production requests 122 and to the shadow proxy service 112 as shadow requests 124. The production system 106 processes the production requests normally using the production version 108 of the software and replies with production responses 126. In the example implementation shown in FIG. 1, the interceptor 110 acts as a relay, receiving the production responses 126 and forwarding the production response 126 to their respective recipients. For example, the interceptor 110 relays the production response 126 that corresponded to the request 120 to the user device as a response 128. While the example implementation shown in FIG. 1 shows the interceptor 110 operating as a relay in the manner discussed above, this is not limiting and has been done for ease of illustration. In other implementations, the production system 106 could reply directly without the interceptor 110 acting as relay.

As discussed above, in addition to forwarding production requests to the production system 106, the interceptor 110 forwards the requests (such as requests 120) to the shadow proxy service 112 as shadow requests 124. To handle shadow requests 124, and shadow testing in general, the shadow proxy service system may use a protocol for shadow testing with standardized meta-data for requests and responses. For example, regarding the metadata, the interceptor 110 may extract some basic metadata about the request 120, service, and/or realm and forwards the metadata to the shadow proxy service 112 along with or as part of the shadow request 124. The interceptor 110 may operate so as to allow the requests to be intercepted in an asynchronous, non-blocking manner and sent to the shadow replay service 112 to minimize the potential for disruption of the production system 106 due to, for example, failures in the shadow proxy service system (such as a failure of the interceptor 110). In some implementations, the publishing of requests to the shadow proxy service 112 may be configurable, such as on a per API level. Some configurable parameters may include a publishing percentage, a sampling methodology, etc.

The shadow proxy service 112 receives and processes the shadow requests 124. To process a shadow request 124 that corresponds to the request 120, the shadow proxy service 112 operates to replay the request 120 to the candidate version 114 and authority version 116 of the software. This is illustrated in FIG. 1 as candidate requests 130 and authority requests 132, respectively. As mentioned above, the candidate version 114 is a version which is to be validated, such as an application stack or software including changes that are to be validated. The authority version 116 is a version of the application stack or software which is used for validating the candidate version 112. For example, in some implementations, the authority version 116 may be a most recent version known to have acceptable functionality and performance. In some implementations, the authority version 114 may be a mirror copy of the production version 108 operated by the production system 106. In other implementations, production system 106 may operate to perform the functions of the authority version 116. In such a case, the authority requests 132 are sent to the production system 106 by the shadow proxy service 112 and may be tagged such that the production system 106 knows the authority request 132 is a shadow request and should be returned to the shadow proxy service 112 instead of the user device 104 and that the processing of the authority request 132 should not result in changes in the production system data used to perform production requests 122. In some implementations, the shadow proxy service 112 operates to dynamically modify at least some of the parameters of the shadow requests 124 before replaying the shadow requests to the candidate version 114 and authority version 116 of the software. In such an implementation, the shadow proxy service 112 may preserve the integrity of the modified shadow request, apart from the intended modifications, to faithfully replay the shadow request.

The candidate version 114 and authority version 116 each receive the candidate requests 130 and authority requests 132, respectively, from the shadow proxy service 112 and process the received requests according to its respective version of the software. Unlike the processing performed by the production system 106 for the production request 120, the processing at the candidate version 114 and authority version 116 is not revealed to the user and/or does not modify data used by the production system 106. Thus, any outputs and/or manipulations of data from the candidate version 114 and authority version 116 are not seen by the user and/or used to generate data that is later output to the user. Instead, the processing by the candidate version 114 and authority version 116 is used to test execution of the candidate version 114. Upon completion of the processing of each of the candidate requests 130 or authority requests 132, the candidate version 114 and authority version 116 send a candidate response 134 or authority response 136 to the shadow proxy service 112, respectively. While FIG. 1 shows the candidate version 114 and authority version 116 as operating separately as independent entities, implementations are not so limited. Rather, in various implementations, the operations of the candidate version 114 and authority version 116 may be performed in parallel, sequentially, or at other times by the same or different computing devices of the shadow proxy service system.

Upon receiving a candidate response 134 and a corresponding authority response 136, the shadow proxy service 112 may compare the fields contained in the candidate response 134 and the authority response 136 along with other information such as latency data or other performance metrics and logs the results. The results of the comparison and the logs are then available for use by the components of the shadow proxy service 112 and dashboard service 118, as will be discussed in more detail below with respect to FIGS. 2 and 3.

Illustrative Computing Architecture

Figure 2:
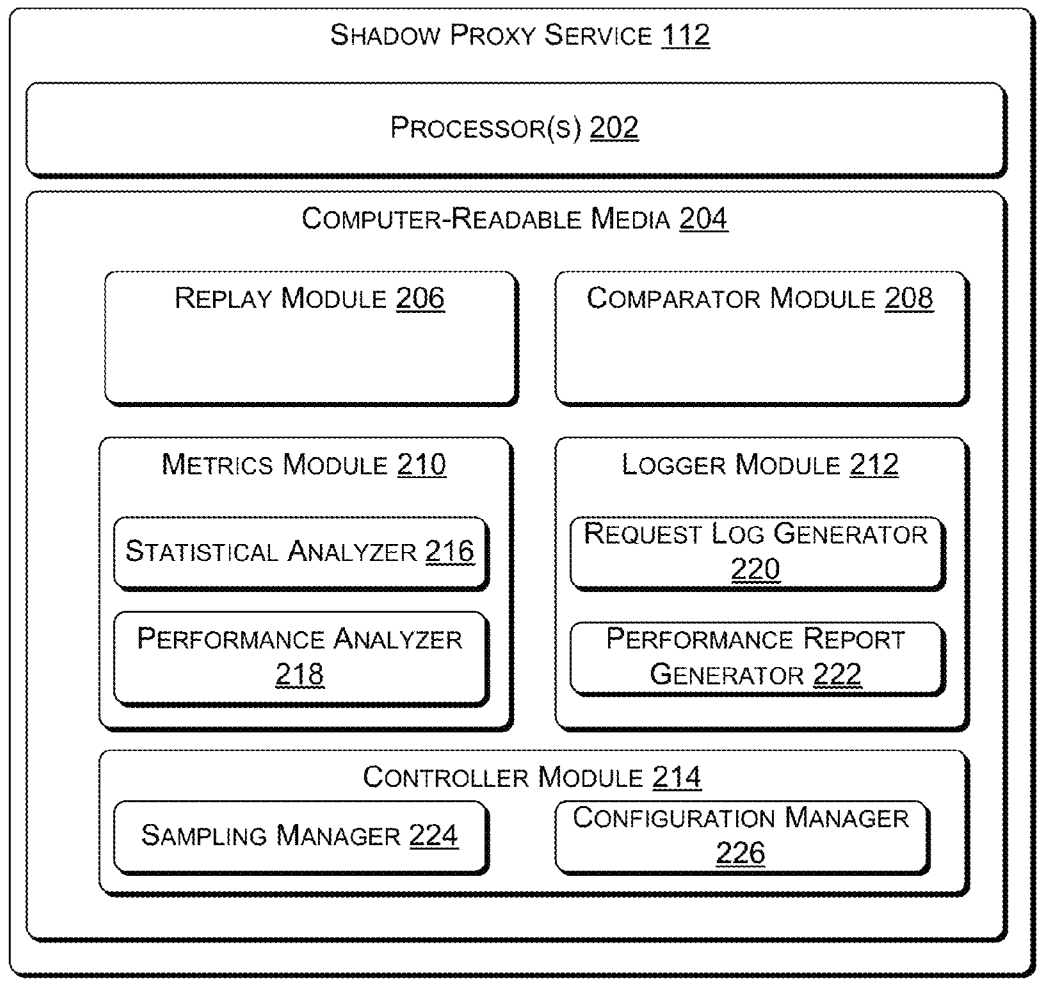
FIG. 2 is a schematic diagram of an illustrative computing architecture to provide a shadow proxy service for software testing of one or more versions of software using shadow requests.

FIG. 2 is a schematic diagram of an illustrative computing architecture 200 of an example shadow proxy service 112 that provides for software testing of one or more versions of software using shadow requests. The computing architecture 200 may be implemented in a distributed or non-distributed computing environment.

The computing architecture 200 may include one or more processors 202 and computer readable media 204 that stores various modules, applications, programs, or other data. The computer-readable media 204 may include instructions that, when executed by the one or more processors 202, cause the processors to perform the operations described herein for the shadow proxy service 112. In some embodiments, the computer-readable media 204 may store a replay module 206, a comparator module 208, a metrics module 210 and associated components, a logger module 212 and associated components, and a controller module 214 and associated components, which are described in turn. The components may be stored together or in a distributed arrangement.

The replay module 206 may operate to replay the shadow requests 124 to the candidate version 114 and authority version 116. In summary, in some implementations, the replay module 206 operates to impersonate the entity making the request and interacts with the candidate version 114 and authority version 116 in accordance with this role. In some implementations, the replay module 206 operates to dynamically modify at least some of the parameters of the shadow requests 124 before replaying the shadow requests to the candidate version 114 and authority version 116 of the software as the candidate request 130 and authority requests 132. For example, the replay module 206 may modify candidate requests 130 to the candidate version 114 to simulate specific behavior for test purposes. In such an implementation, the replay module 206 may preserve the integrity of the modified shadow request, apart from the intended modifications, to faithfully replay the shadow request. Upon receiving the candidate response 134 and authority response 136 corresponding to a particular shadow request 124, the replay module 206 publishes these items to the comparator module 208.

The comparator module 208 may receive the candidate response 134 and authority response 136 and, with regard to each candidate/authority pair, compares the response 134 to the response 136. In some implementations, the comparator module 208 tags and/or classifies at least some of the differences that are ascertained between the responses. For example, the comparator may tag or classify differences which are specified to be important or unacceptable to the functioning of the software. In some implementations, extensible modeling language based definitions may be used to define the comparison and replay by the shadow replay service 112 based on a standardized format. Using such definitions, the comparator module 208 may allow differences based on planned functionality changes in the candidate version 114 to be suppressed (e.g. ignored). Of course, in some implementations, such suppression of differences based on planned functionality changes in the candidate version 114 may be implemented at a variety of levels and/or other modules rather than by the comparator module 208. The results of the comparison module 208 are provided to the metrics module 210 and the logger module 212.

The metrics module 210 may generate metrics from the results of the candidate version 114 and the authority version 116 of the software provided by the comparator module 208. The statistical analyzer 216 may determine a trend in the number of differences identified by the comparator module 208 to be unacceptable, determine the number of unacceptable differences identified, capture the trend and/or cause an alarm to be sent to the dashboard service 118. The statistical analyzer 216 may determine positive or negative trends for the candidate version 114 of the software. For example, the statistical analyzer 216 may determine that a particular shadow request input is indicative or correlated with a particular outcome (either good or bad). The statistical analyzer 216 may then indicate or record the trend to enable the dashboard service 118 to report the trend and take appropriate action, if necessary. The statistical analyzer 216 may also use confidence levels when determining the trends. The performance analyzer 218 may determine or measure performance trends based on performance of each of the candidate and authority versions of the software. The performance analyzer 218 may determine how the system resources are responding to use of the versions of software, include processing of spikes in activity, response time, memory allocation, throughput, bandwidth, or other system performance measurement attributes. The system performance may be analyzed using business metrics, system level metrics (e.g., memory, processor, etc.), and/or application level metrics (e.g., bugs, errors, etc.). For example, the performance analyzer 218 may provide statistics on latency differences between the candidate service 114 and the authority service 116. The metrics module 210 or the comparator module 208 may also determine when a candidate version of the software includes a bug or other error. Further, in some embodiments, the results of the metrics module 210 and/or the comparator module 208 may be used to identify a failing service in a cascading sequence of service calls where the failing service is a downstream service that is causing difference in all of one or more upstream services. The results of the statistical analyzer 216 and performance analyzer 218 may be output at least to the logger module 212.

The logger module 212 shown in FIG. 2 may comprise at least two components, a request log generator 220 and a performance report generator 222. The request log generator 220 logs data related to the shadow requests 124 which have been processed by the replay module 206, comparator module 208 and metrics module 210. The request log generator 220 may log all data relating the shadow requests or some appropriate subset, depending on the particular implementation and configuration settings. In some implementations, the request log generator 220 may store the requests, responses and differences in distributed computing-based storage, with indexed fields for searching. The performance report generator 222 may generate a performance report, which may be based at least in part on an output of the performance analyzer 218.

As mentioned above, many operations of the replay module 206, the comparator module 208, the metrics module 210, and the logger module 212, as well as the interceptor 110, are configurable. In the implementation shown in FIG. 2, the configuration settings are controlled at least in part by a controller module 214. In particular, a sampling manager 224 of the controller module 214 controls aspects of the interceptor 110 and the shadow proxy service 112 relating to determining which of the requests 120 are intercepted and processed as the shadow requests 124, which of the shadow requests 124 are actually processed by the shadow proxy service 112 as described above, and so on. The sampling manager 224 refers to the configuration manager 226 which interacts with the various systems and users (such as the dashboard service 118) to obtain the configuration settings for the shadow proxy service 112. Each of the replay module 206, the comparator module 208, metrics module 210, and logger module 212 may refer to the configuration manager 226 to obtain configuration information or the configuration manager 226 may directly configure the other modules. One example operation performed by the sampling manager 224 may be to receive a predetermined confidence level and then calculate the number of samples (shadow requests) necessary to achieve the predetermined confidence level. Such a confidence level may be determined based on various factors such as a number of unacceptable differences per a number of shadow requests, a requirement that some measurement of code paths have been exercised or a mix of use cases to be covered during the shadow testing. In addition to the configurability discussed above, the shadow proxy service system of some implementations may allow for pluggable modules based on standardized interface. Such implementations may allow for custom modules which adhere to the standardized interface to be plugged into the shadow proxy service system in place of the default modules (e.g. a custom comparator module 208 and custom metrics module 210 in place of the default modules).

Figure 3:
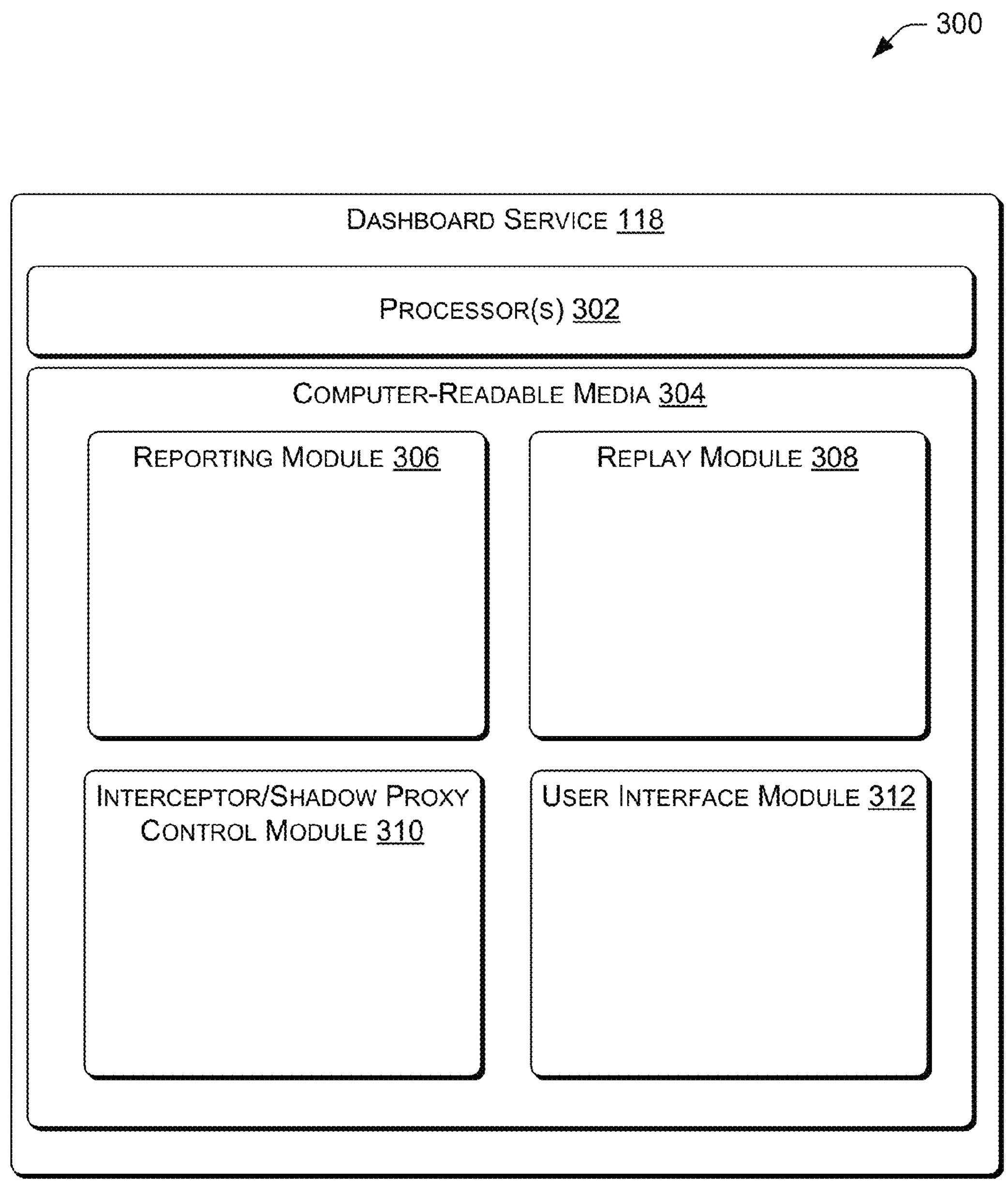
FIG. 3 is a schematic diagram of an illustrative computing architecture to provide a dashboard service for software testing of one or more versions of software using shadow requests.

FIG. 3 is a schematic diagram of an illustrative computing architecture 300 of an example dashboard service 118 that provides interaction with and/or control of the shadow proxy service 112. The computing architecture 300 may be implemented in a distributed or non-distributed computing environment.

Similar to the computing architecture 200, the computing architecture 300 may include one or more processors 302 and computer readable media 304 that stores various modules, applications, programs, or other data. The computer-readable media 304 may include instructions that, when executed by the one or more processors 302, cause the processors to perform the operations described herein for the dashboard service 118. In some embodiments, the computer-readable media 304 may store a reporting module 306, a replay module 308, an interceptor/shadow proxy control module 310 and a user interface module 312, which are described in turn. The components may be stored together or in a distributed arrangement.

As mentioned above, the dashboard service 118 provides for interaction with and/or control of the interceptor 110 and/or shadow proxy service 112. In some implementations, the dashboard service 118 provides the interaction and/or control, in at least two regards. First, the dashboard service 118 collects and parses the results logged by the logger module 212, providing users of the dashboard service 118 with this information. Second, the dashboard service 118 interacts with the controller module 214 to configure the interceptor 110 and/or shadow proxy service 112 and/or to setup and request replay of one or more shadow requests 124, such as a set of the shadow requests 124 represented in the logs generated by the request log generator 220 or the shadow requests 124 as received from the interceptor 110. To select the one or more logged or stored shadow requests 124 to be replayed, the dashboard service may provide search and display capability for stored requests and differences. For example, subsequent to a change in the candidate version 114, the dashboard service 118 may request that the shadow proxy service 112 replay the shadow requests 124 that resulted in unacceptable differences between the candidate responses 134 and authority responses 136 to the changed candidate version 114, and in some implementations, to the authority version 116 as well. Once the requests 124 have been replayed to the changed candidate version 114, either the shadow proxy service 112 or the dashboard service 118 makes a comparison between the new responses and the original responses to determine if the unacceptable differences have been resolved. The general purpose of modules 306-312 in the example implementation shown in FIG. 3 is discussed below, followed by a discussion of the example operations performed by, or caused to be performed by, these modules.

The reporting module 306 may operate to collect or receive the data generated by the logger module 212 and any other data, and prepare the data for presentation to a user via the user interface module 312. For example, the reporting module 306 may collect the trend data generated by the metrics module 210 and prepare this data for presentation in a graph.

The replay module 308 operates in the manner discussed above to cause one or more of the logged shadow requests 124 to be replayed. In some implementations, this is performed by requesting that the shadow proxy service 112 replay the shadow requests 124 with any desired changes in the setup. Though not illustrated in the figures, in some implementations, the replay module 308 may include a copy of the candidate version 114, the authority version 116, and/or a changed candidate version or the replay module 308 may interact directly with one or more of these versions of the software being tested. In such an implementation, the replay module 308 would replay the shadow requests 124 directly to the appropriate versions of the software and/or make the appropriate analysis of the results. As discussed above, one example reason for replaying the shadow requests 124 would be to determine if a changed candidate version has reduced, eliminated, or exacerbated any unacceptable differences between the candidate response 134 and authority responses 136. The results of the replay of the shadow requests 124 would be passed, for example, to the reporting module 306 for preparation for presentation to the user via user interface module 312 (possibly after being analyzed by the comparator module 208, the metrics module 210, the logger module 212, and/or other similar modules).

The interceptor/shadow proxy control module 310 operates to allow for configuration and/or control of the interceptor 110 and shadow proxy service 112 by, for example, a user of the dashboard service 118 interacting with the dashboard service 118 through user interface module 312. An example control that may be performed by the control module 310 would be to configure comparator module 208 to tag differences in specific fields for audit and display purposes rather than all fields. As indicated above, the user interface module 312 of the dashboard service 118 presents a user interface to dashboard service users to allow for interaction by the user with the shadow proxy service system.

The dashboard service 118 discussed above may be used to control the combination of the interceptor 110 and the shadow proxy service 112 in various ways such as those discussed below.

As alluded to previously, through interaction with the dashboard service 118, a dashboard user is able to configure the duration of the testing, such as by configuring conditions upon which the interceptor 110 stops intercepting requests to the production system 106. Some types of conditions are described below.

One example condition for controlling the duration of the shadow testing is a specified mix of use cases represented by the shadow requests 124, such as m number of a first use case shadow requests, n number of a second use case shadow requests, and so on. Use cases of particular shadow requests 124 could be determined by the tagging and/or classifying function of the comparator module 208 discussed above. In addition to using the mix of use cases to drive the duration of the shadow testing, the dashboard service 118 could use the determined use cases to provide information on the distribution of use cases to the dashboard users via the reporting module 306 and user interface module 312. In some implementations, the use case reporting may be updated on a real-time basis as shadow requests 124 are received by the shadow proxy service 112 and processed. Such use case information could be presented in a textual manner or as in visualization (such as a chart) for ease of comprehension. Of course, the determination of use cases and subsequent presentation of the distribution of the use cases represented by the shadow requests 124 that have been processed may also be performed without the use of this information to control the duration of the shadow testing.

Another example condition for controlling the duration of the shadow testing is a measure of code coverage. For example, the shadow proxy service system could be configured to continue the shadow testing until a defined percentage or other measurement of the code of the candidate version 114 has been tested to a satisfactory degree. One example implementation to determine code coverage of a shadow request would be to instrument code of the candidate version 114 to be tested such that when a portion of the code is executed, it outputs an indication of its execution. Such instrumenting could be coded into the source code of all versions of the software but selectively compiled based on a flag during the compilation process. Thus, when a candidate version is to be generated by the compiler, the flag would be set and the code coverage instrumentation code would be compiled into the candidate version. When a production version of the software is to be compiled, the flag would not be set and the compiler would ignore the code coverage instrumentation code.

Further, the shadow proxy service system described herein may also be integrated with a source code control system of the software being tested to allow for identification of code changes that resulted in deviance from expected results and/or to identify the code paths which map to the differences in responses between the candidate version 114 and the authority version 116. Integration with the source code control system may also allow the shadow proxy service system to include an automatic source code rollback function for the candidate version 114 of the software. For example, based on threshold of response differences or latency increases, the dashboard service, either through program logic or explicit use instruction, could instruct the source code control system to rollback changes to the source code of the software being tested. In addition to using the code coverage to drive the duration of the shadow testing, the dashboard service 118 could use the determined code coverage to provide information on the code coverage to dashboard users via the reporting module 306 and the user interface module 312. As with the use case reporting, in some implementations, the code coverage reporting may be updated on a real-time basis as shadow requests 112 are received by the shadow proxy service 112 and processed. Such code coverage information could be presented in a textual manner or as in visualization (such as a chart or graph) for ease of comprehension. Of course, the determination of code coverage and subsequent presentation thereof may be performed without the use of this information to control the duration of the shadow testing.

Illustrative Operation

Figure 4:
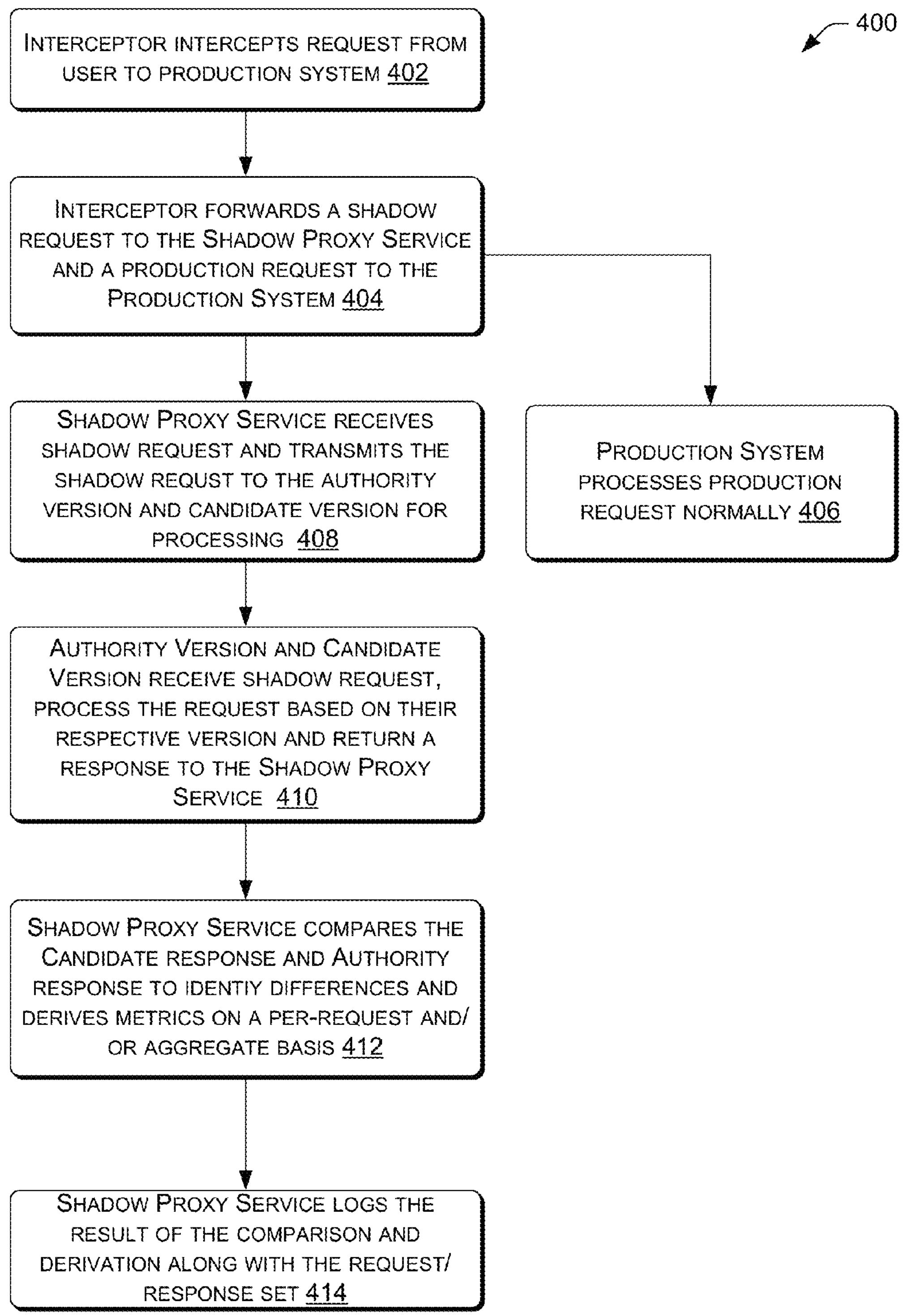
FIG. 4 is a flow diagram of an illustrative process to perform the shadow request to test one or more versions of software.

FIG. 4 is a flow diagram of an illustrative process 400 that provides for software testing of one or more versions of software using shadow requests as described above regarding FIGS. 1-3 and may be performed by the shadow proxy service 112 in conjunction with the production system 106, the interceptor 110, and the dashboard service 118. Of course, the process 400 (and other processes described herein) may be performed in other similar and/or different devices and/or in different environments. The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media (e.g., machine readable storage media) that, when executed by one or more processors, perform the recited operations. Generally, computer-executable instructions include routines, programs, objects, components, data structures, and the like that perform particular functions or implement particular abstract data types. Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/computer-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download. The order in which the operations are described is not intended to be construed as a limitation, and any number of the described blocks can be combined in any order and/or in parallel to implement the process. Other processes described throughout this disclosure (e.g. FIG. 5), in addition to process 400, shall be interpreted accordingly.

At 402, the interceptor 110 intercepts a request 120 from the user 102 to the production system 106. At 404, the interceptor 110 forwards a shadow request 124 to the shadow proxy service 112 and a production request 122 to the production system 106. At 406, the production system 106 processes the production request 122 normally such that a production response 126 is sent back to the user device 104. Similarly, at 408, the shadow proxy service 112 receives the shadow requests 124 and sends the shadow requests 124 to the candidate version 114 and authority version 116 for processing.

At 410, the candidate version 114 and authority version 116 receive the shadow request 124 as the candidate request 130 and authority request 132 and process the requests based on their respective version of the software being tested and return a candidate response 134 and authority response 136 to the shadow proxy service 112, respectively. As stated above regarding FIG. 1, in some implementations, the functions of the authority version 116 may be fulfilled by the production system 106 and, more particularly, the production version 108 of the software operating therein. Also, in some implementations, the candidate version 114 and authority version 116 may need to interact with devices outside of the shadow proxy service system, such as the production system 106, in order to process the candidate request 130 and authority request 132. In such cases, the interactions with the outside devices may be marked as shadow interactions to prevent the outside devices operating on the interactions as if the interactions were production interactions that modify the production system state and/or data. For example, in the case of "stateful" transactions, some implementations may support a way to store stateful data (e.g., transaction data), as "shadow transaction data" which will be ignored by production systems. The shadow transaction data will be written by the candidate version 114, and the shadow proxy service 112 loads the shadow transaction data and compares it to "production transaction data" or "authority transaction data" after processing each request. Depending on the details of the implementation, "authority transaction data" may also be marked in a similar manner to as "shadow transaction data."

Other implementations may provide support for stateless shadow testing for transaction-based (i.e., stateful) services. That is, such implementations provide hooks in the candidate version 114 of the software to avoid the side effect of storing data in a persistent data store. This allows requests to be sent to the candidate service without resulting in storage of transactional data.

At 412, the shadow proxy service 112 compares the candidate response 134 with the authority response 136 to identify differences there between. The shadow proxy service 112 also analyzes the responses and, based on one or more candidate/authority response pairs, derives metrics for the shadow requests 124 on both a shadow request by shadow request basis and an aggregate basis.

Finally, at 414, the shadow proxy service 112 may log the results of the comparison and derivation analysis with the request and response set. The shadow proxy service 112 may store the logged information in a variety of ways.

In some implementations, the logged shadow requests may be stored in a searchable catalog organized in a hierarchical manner. For example, the following might be paths in the hierarchy:

NA→US→Company the retailer→digital items→address is in New York

NA→US→Company the retailer→movies→address is in California

NA→US→third party sellers→books→address is in Michigan

NA→CA→third party sellers→books→address is in Ontario

EU→UK→Company the retailer→music items→address is in London

EU→DE→Company the retailer→music items→address is in Berlin

For each node in the hierarchy, the shadow proxy service 112 may provide support to replay all or a subset of the shadow requests under that node.

In some implementations, the stored logs provide support for an additional type of testing not explicitly mentioned above. In particular, using the stored logs including stored requests and responses, the shadow proxy service 112 may also provide support for regression testing. In other words, the shadow proxy service 112 may be capable of running a full regression suite from a node in the request/response catalog against a candidate version by replaying the stored requests and comparing the candidate responses against the stored shadow responses. This way, a new candidate version may be thoroughly regression tested using a large number of "realistic" production requests (as much as hundreds of thousands or millions). Such testing is based on the principle that the behavior in production presumed correct and therefore the stored responses can be used to qualify new candidate versions, for example, prior to shadow testing.

Another storage option is to create an index where each shadow request is labeled with a unique ID. Such an index may resemble the following:

Company SOR ID: request_01, request_02, . . .

E-Book Item: request_04, request_02, . . .

US Order International ship address: request_04

Figure 5:
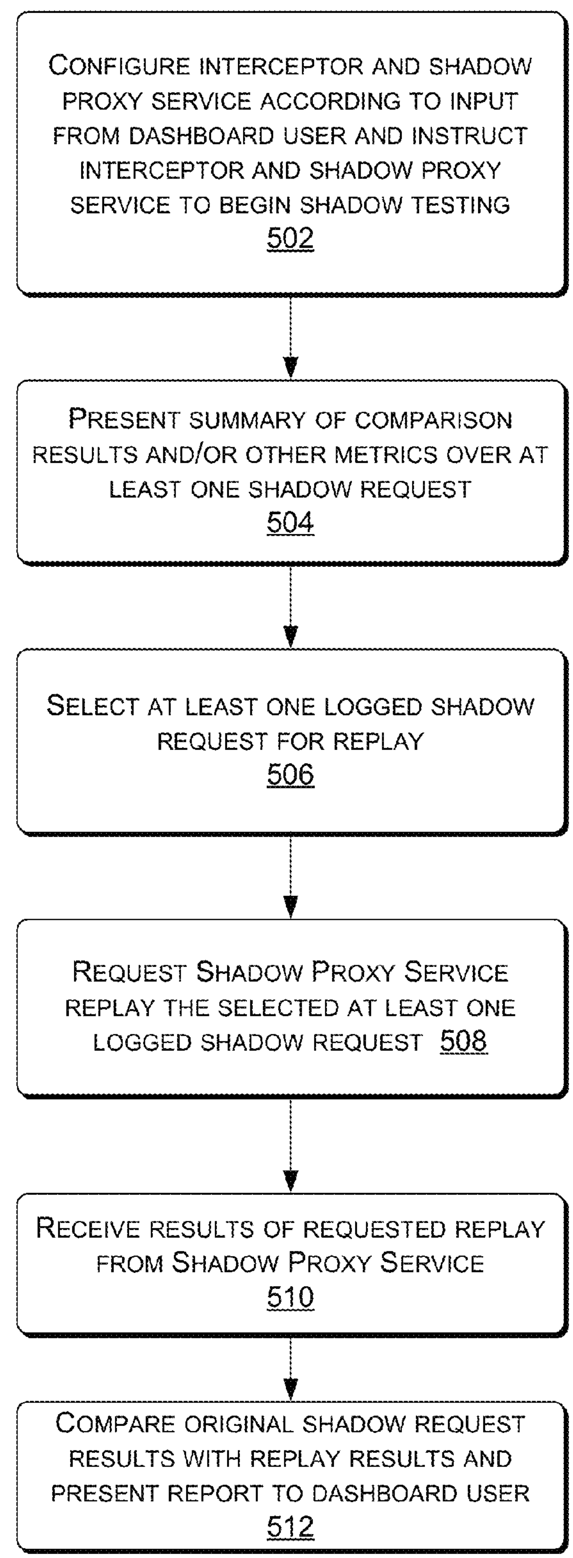
FIG. 5 is a flow diagram of an illustrative process to perform a replay of at least one the shadow requests to test one or more versions of software.

This second option allows for a single request to be mapped to multiple scenarios. To express the hierarchical paths in such an index, the shadow proxy service 112 could use set intersection. The generation of the request repository and generation of the metadata index may be automated and regenerated from production requests. In some implementations, the repository generation process may continue until the a specified index is "complete," meaning each entry in the index maps to at least one request or even that specific combinations of indexes exist, e.g. Non-Company SOR AND E-book. Such an index may provide for very specific use cases to be regression tested with limited numbers of other use cases being exercised. In some implementations, rather than testing one hundred thousand to ten million requests and relying on the assumption that the large number of shadow tested requests provide the coverage needed, a smaller number of requests may be tested with a higher degree of certainty that the coverage is provided. Further, when a regression test fails, a user may immediately know what use case failed. In some implementations, if the user knows the behavior of the software is going to change between the authority version and the candidate version, the user would be able to exempt use cases based on the meta data affected by the behavior change FIG. 5 is a flow diagram of an illustrative process 500 that provides for software testing of one or more versions of software using shadow requests as described above regarding FIGS. 1-3 and may be performed by the dashboard service 118. In particular, process 500 illustrates an example process flow showing the operations of the dashboard service 118, from initiating shadow testing to using replay results to determine if a new candidate version resolves unacceptable differences identified in a previous candidate version (e.g. the candidate version at the initiation of the process 500). It should be noted that there is no requirement of a new candidate version. This is merely an example scenario used to aid in comprehension.

At 502, the dashboard service 118 configures the interceptor 110 and shadow proxy service 112 according to input from a dashboard user. Once the interceptor 110 and shadow proxy service 112 are configured, the dashboard service 118 instructs the interceptor 110 and shadow proxy service 112 to begin shadow testing. Although, direct communication with the interceptor 110 by the dashboard service 118 is implied in this discussion, such is not always the case as the shadow proxy service 112 may handle the configuration and instruction of the interceptor 110 based on its own instructions from the dashboard service 118. Moreover, it should be noted that with regard to the control of the shadow proxy service 112 by the dashboard service 118, this is merely an example implementation. The dashboard service 118 is not required for the operation of the shadow proxy service 112 in all implementations. In other words, the shadow proxy service 112 may operate independently or exclusive of the dashboard service. For example, the shadow proxy service 112 may include logic or instructions to determine the configuration without input from the dashboard service 118. Alternatively, the shadow proxy service 112 may have an internal means by which users or other applications may configure its settings. In still further implementations, the shadow proxy service 112, the dashboard service 118, and interceptor 110 of the shadow proxy service system may be merged into a single device or application; or the various parts, modules, or the operations performed by the shadow proxy service 112, the dashboard service 118, and interceptor 110 may be reorganized amongst them. For example, the metrics module may be a component of the dashboard service 118 rather than the shadow proxy service 112.

At 504, the dashboard service 118 presents a summary of the results of a comparison of a pair including a candidate response 134 and a corresponding authority response 136, aggregate information over a plurality of comparisons of candidate responses 134 and corresponding authority responses 136 and/or other metrics for at least one shadow request 124. The dashboard service 118 may further provide built-in alarming for notifying dashboard users or other appropriate parties, such as the owners of the software being tested, of deviation from expected results.

At 506, the dashboard service controller or user selects at least one logged shadow request for replay. Depending on the users' intent, the dashboard service 118 may provide the user with options to select the fields of the shadow response structure to make the comparison on as well as which fields to include in the request log report. For example, in some cases, the dashboard user knows that some fields will be changed due to a change in function or the fields may be randomly generated. In such a case, the user may wish to have one or more such fields excluded from the analysis.

At 508, the dashboard service 118 requests the shadow proxy service 112 replay the selected at least one logged shadow request in the manner specified. At 510, the dashboard service 118 receives the results of requested replay from shadow proxy service 112. At 512, the dashboard service 118 compares the original shadow request results with results of the replay and presents a report to dashboard user based thereon. For example, in a situation in which the shadow requests that were selected for replay were shadow requests corresponding to candidate responses 134 that differed unacceptably from the corresponding authority responses 136 and a "fix" has since been applied to the candidate version 114, the report regarding the replay presented to the user by the dashboard service 118 may indicate to what extent, if any, the unacceptable differences have been reduced.

Multi-Service Shadow Proxy Service System

Figure 6:
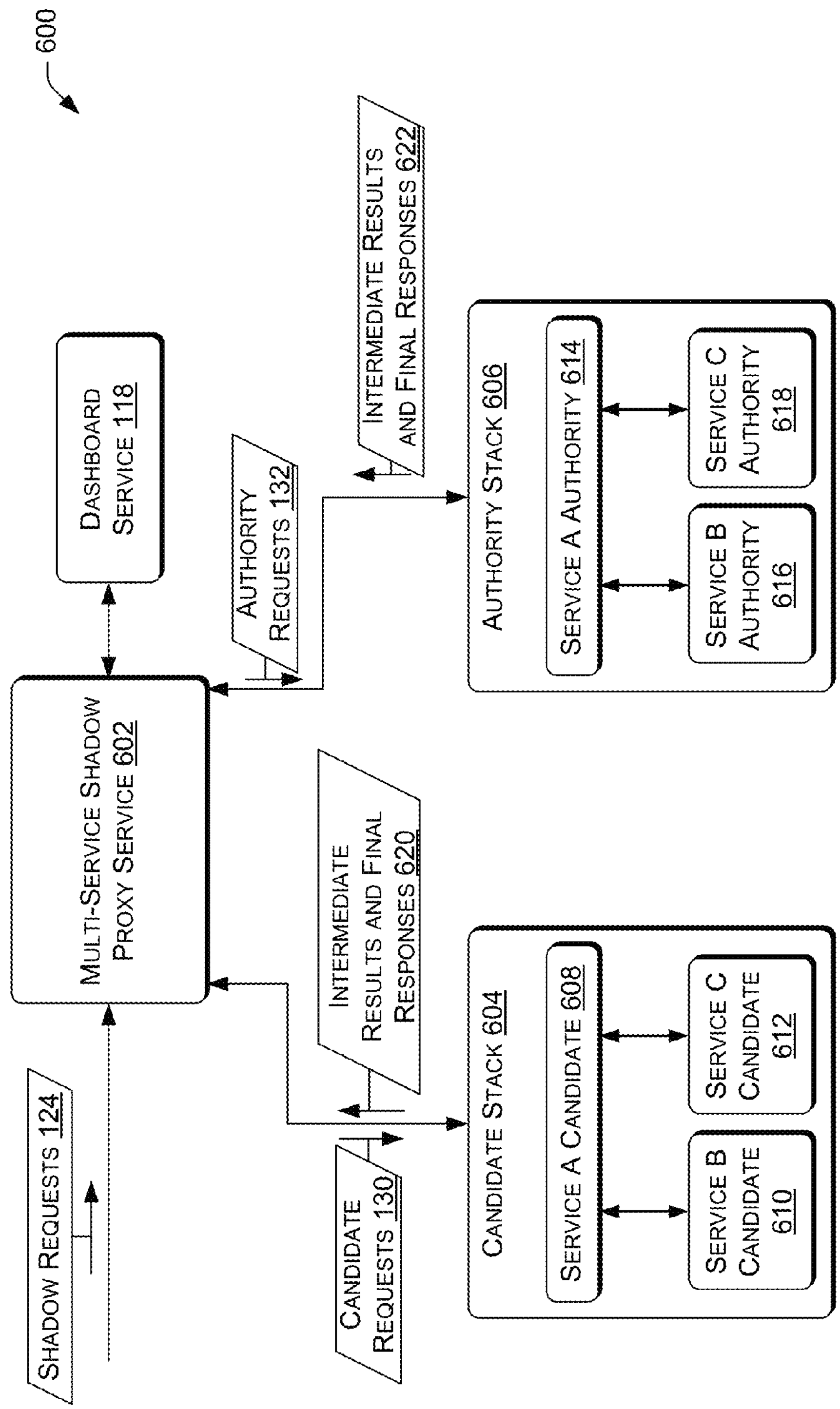
FIG. 6 is a schematic diagram of an illustrative environment that provides for multi-service software testing using shadow requests.

FIG. 6 is a schematic diagram of an illustrative environment 600 that provides for the use of a multi-service shadow proxy service system including a multi-service shadow proxy service 602, a candidate stack 604 and an authority stack 608. Specifically, a multi-service shadow proxy service system is another implementation of the shadow proxy service system discussed above regarding FIG. 1. As mentioned above, in some implementations, the results of the shadow testing may be used to identify a failing service of a group of services in a cascading sequence of service calls, wherein the failing service is a downstream service causing unacceptable differences in the results of one or more upstream services. FIG. 6 illustrates one such implementation.

In operation, the multi-service shadow proxy service 602 functions similarly to the shadow proxy service 112 to receive shadow requests 124 that are intercepted by interceptor 110 and issues candidate requests 130 and authority requests 132 to candidate stack 604 and authority stack 606, respectively. Unlike the scenario illustrated in FIG. 1, the candidate requests 130 issued by the multi-service shadow proxy service 602 in FIG. 6 are processed by multiple services to obtain candidate responses.

The following is an example scenario in which such multi-service operations may occur. In FIG. 6, the candidate requests 130 are received by a service A candidate 608. Service A candidate 608 interacts with a service B candidate 610 to obtain a first intermediate result. The service A candidate 608 then uses the first intermediate result to conduct further interactions with a service C candidate 612 and, as a result, obtains a second intermediate result. The second intermediate result is then used to generate the candidate response. Of course, similar processing occurs with respect to the authority requests 132, a service A authority 614, a service B authority 616 and a service C authority 618 to produce the authority responses.

If the multi-service shadow proxy service 602 were only to compare and analyze the candidate responses and the authority responses, it may be difficult to determine whether any differences arise from the service A candidate 608, the service B candidate 610 or the service C candidate 612. Accordingly, in the implementation illustrated in FIG. 6, the candidate stack 604 and the authority stack 606 each return the intermediate results and final responses generated by its respective services as intermediate results and final responses 620 and 622, respectively.

If the multi-service shadow proxy service system 602 detects a difference between the candidate response and authority response in items 620 and 622, additional processing may be undertaken with regard to the intermediate results to ascertain the service in which the difference originates. In other words, if the first intermediate result of the interaction between service A and service B is the same in the candidate stack 604 and authority stack 606, but the second intermediate result of the interaction between service A and service C differs between the candidate stack 604 and authority stack 606, the difference likely originates in the service C candidate 612.

While shown as another implementation of the shadow proxy service system, the functionality of the multi-service shadow proxy system 602 may be incorporated into the shadow proxy service 112. In other words, the shadow proxy service 112 could provide the functionality of the multi-service shadow proxy system 602. For example, when shadow testing is performed with shadow requests that do not result in cascading service calls, the shadow proxy service 112 may operate as discussed with regard to FIG. 1. For shadow requests that result in cascading service calls, the shadow proxy service 112 may function as discussed above with regard to the multi-service shadow proxy servers 602.

Canary Fleet

Figure 7:
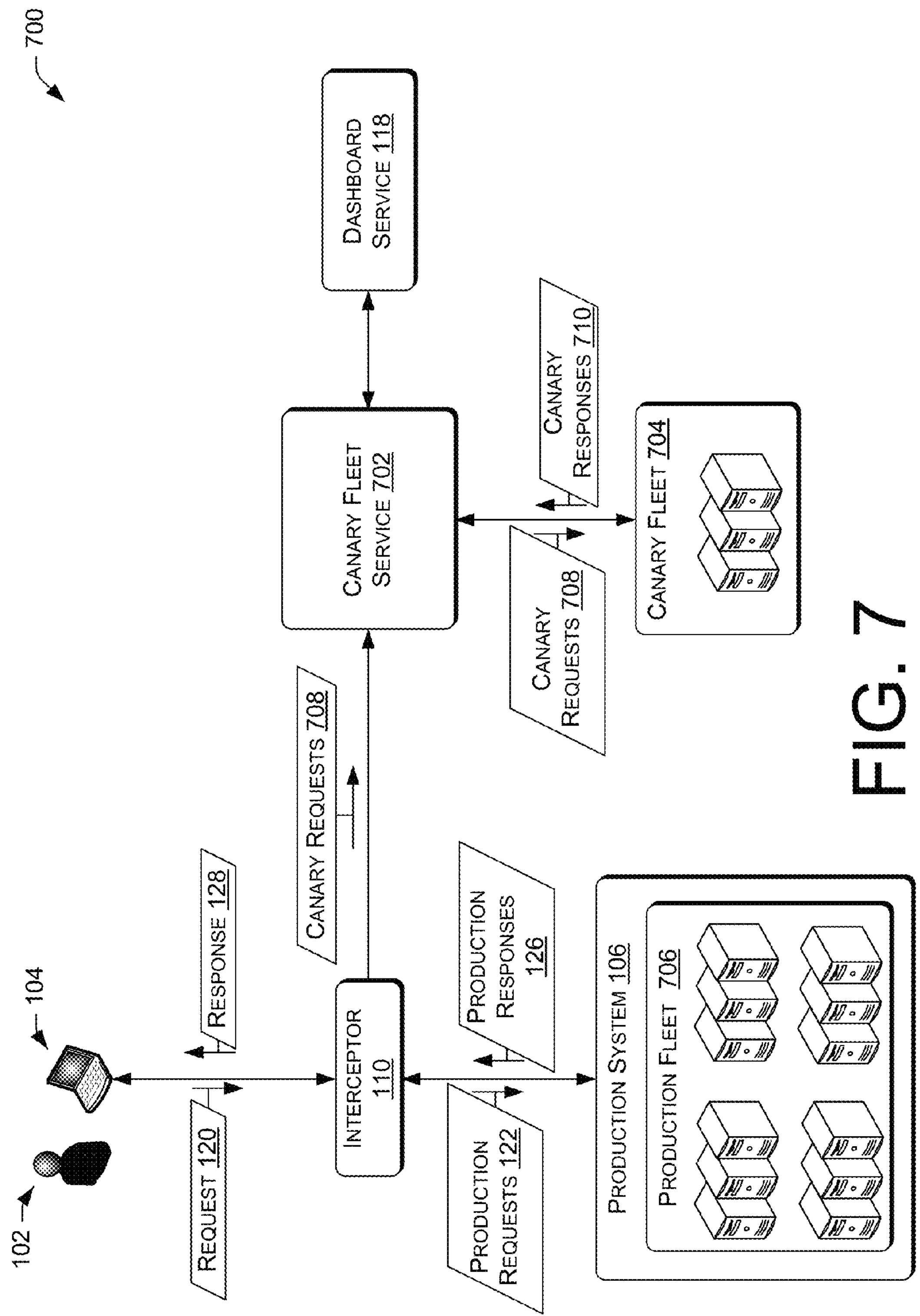
FIG. 7 is a schematic diagram of an illustrative environment that provides a canary fleet service.

FIG. 7 is a schematic diagram of an illustrative environment 702 that provides for the use of a canary fleet system including a canary fleet service 702 and a canary fleet 704. Specifically, a canary fleet system is an alternative implementation of the shadow proxy service system discussed above regarding FIG. 1. As the name implies, the canary fleet 704 is to the production fleet 706 of the production system 106 as a canary is to a coal miner. In other words, the canary fleet 704 may serve as an early warning of problems for the production fleet 706 or the canary fleet 704 may allow for issues such as "poison pills" to be more quickly recognized due to a smaller overall fleet size. Herein, fleets are made up of system resources. As discussed above, these system resources may be computing devices, distributed computing services, server farm(s), or other types of resources that can execute the various versions of the software.

As shown in FIG. 7, the illustrative environment 700 includes the user 102 operating the user device 104 and the production system 106 which is shown to be operating a production fleet 706 of computing devices. The production fleet 706 operates the production version 108 of the software discussed with regard to FIG. 1. FIG. 7 also includes the interceptor 110 and dashboard service 118 described above with regard to FIG. 1. Unlike FIG. 1, FIG. 7 includes the canary fleet service 702 and the canary fleet 704. In some implementations, the canary fleet 704 operates the same production version 108 of the software as the production system 106. However, other implementations may have the canary fleet 704 operate a different version of the software. The operation of the canary fleet system is similar to the shadow proxy service system described above regarding FIG. 1 in that a configurable number of requests to the production system 106 are intercepted and a copy is sent to the canary fleet service 702 as canary requests 708. The canary fleet service 702 sends the canary requests 708 to the canary fleet 704 while impersonating the requesters corresponding to the canary requests 708. A notable difference in the functionality of the canary fleet service system from the shadow proxy service system is that, in the canary fleet system, comparisons for unacceptable differences are not likely to be necessary as the production fleet 706 and canary fleet 704 are usually operating the same production version of the software. However, some metrics may still be analyzed and reported to the dashboard service 118 for presentation to dashboard users. For example, the latency and similar metrics of the canary fleet 704 may be monitored to determine the effect of the increased traffic on the production fleet 706. The canary fleet 704 may serve other several purposes.

In some implementations, the basic idea of the canary fleet 704 is to direct a proportional number of production requests 122 multiplied by some factor to the canary fleet 704. This would allow for the simulation of an increased load based on actual traffic to determine what would happen to the production fleet 706 if the traffic was increased by that factor. For example, suppose there are one hundred hosts in the production fleet 706. The canary fleet 704 may have five hosts, or five percent (5%) of the production fleet capacity. Duplicating and sending ten percent (10%) of the production requests 122 to the canary fleet 706 as canary requests 708 acts to simulate a 100% load increase on the production fleet 706.

In some implementations, the canary fleet may serve the purpose of an early warning system as alluded to above. For example, if the production fleet 706 is about to brown or black out due to either "poison pill" requests or an increased volume of production requests 122, the canary fleet should suffer the problem first, alerting the managers of the production fleet 706 to the problem before it has an effect on production traffic. For example, in the event of a simple increase in traffic within a distributed computing environment, an increased load on the canary fleet 704 would lead to the allocation of additional production computing devices to the production fleet 706. Another option for load increases might be to throttle misbehaving clients. As such, the canary fleet 704 may have the capability to identify misbehaving clients and publish throttling metrics for those clients. In the event "poison pill" requests are received, the canary fleet 704 may be capable of identifying the problem and generating and publishing a destructive request blacklist.

While shown as an alternative implementation of the shadow proxy service system, the functionality of the canary fleet system may be incorporated therein. In other words, the shadow proxy service system could provide the functionality of the canary fleet system. For example, when shadow testing is not in progress, the shadow testing fleet (not shown) may be reallocated as a canary fleet 704. Alternatively, the computing devices of the shadow test/canary fleet may be allocated between the two purposes as required for the shadow proxy service system to provide both shadow testing and canary fleet functionality in parallel.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed:

1. A shadow proxy system, comprising:

an interceptor, stored in at least one of one or more memories, that performs an asynchronous and non-blocking intercept of at least one request to a production version of a software and that provides the intercepted at least one request to a shadow proxy service as at least one shadow request;

the shadow proxy service, stored in at least one of the one or more memories, that processes the shadow request by:

causing the at least one shadow request to be processed by a candidate version of the software and an authority version of the software, the candidate version of the software being a version of the software being validated and the authority version of the software being a version of the software that is used for validating the candidate version of the software;

receiving, in response to processing the at least one shadow request, at least one candidate response from the candidate version and at least one authority response to from the authority version; and comparing the at least one candidate response to the at least one authority response to obtain a result; and a dashboard service, stored in at least one of the one or more memories, that provides at least the result of the comparison and that requests the shadow proxy service replay at least one shadow request based at least in part on the result of the comparison.

2. The shadow proxy system as recited in claim 1, wherein the shadow proxy service further determines a latency difference between the candidate version and the authority version based at least in part on the received at least one candidate response and the at least one authority response.

3. The shadow proxy system as recited in claim 1, wherein the comparison of the at least one candidate response to the at least one authority response by the shadow proxy service identifies differences specified as being unacceptable to the operation of the candidate version of the software.

4. The shadow proxy system as recited in claim 3, wherein the shadow proxy service replays the at least one shadow request using a modified candidate version and determines if at least one difference specified as being unacceptable to the operation of the software that occurred in the at least one candidate response of the candidate version occurs in at least one replay candidate response generated by the modified candidate version.

5. The shadow proxy system as recited in claim 1, wherein the production version of the software modifies system data of a production system and the shadow proxy service causes the at least one shadow request to be processed by the candidate version and the authority version such that system data of the production system is not altered.

6. A computer-implemented method comprising:

under control of one or more processors configured with executable instructions, intercepting, in a non-blocking manner, at least one request to a production version of a software to generate at least one respective shadow request;

requesting a candidate version of the software to process the at least one shadow request, the candidate version of the software being a version of the software being validated;

requesting an authority version of the software to process the at least one shadow request, the authority version of the software being a version of the software that is used for validating the candidate version of the software;

receiving, in response to processing the at least one shadow request, at least one candidate response from the candidate version and at least one respective authority response from the authority version; and generating a result based on a comparison between the at least one candidate response with the at least one respective authority response.

7. The computer-implemented method as recited in claim 6, further comprising determining at least a latency difference between the candidate version and the authority version based at least in part on the received at least one candidate response and the at least one authority response.

8. The computer-implemented method as recited in claim 7, further comprising triggering a notification if at least one of the latency difference or the result of the generating fails to meet at least one condition.

9. The computer-implemented method as recited in claim 7, further comprising triggering an automatic rollback of the candidate version to a version of the software prior to the candidate version if at least one of the latency difference or a result of the generating fails to meet at least one condition.

10. The computer-implemented method as recited in claim 6, further comprising:

determining at least one use-case of the software exercised by at least one intercepted requests;

determining a mix of use-cases of the software exercised by the intercepted requests; and wherein the intercepting is performed at least until one or more conditions regarding the mix of use-cases of the software exercised by the intercepted requests are satisfied.

11. The computer-implemented method as recited in claim 6, further comprising:

determining at least a code coverage of the software of the at least one intercepted requests;

determining an aggregate code coverage of the software of the at least one intercepted requests; and wherein the intercepting is performed until one or more conditions regarding the aggregate code coverage of the one or more of the requests are satisfied.

12. The computer-implemented method as recited in claim 6, wherein the production version of the software modifies system data of a production system and the at least one shadow request is processed by the candidate version and the authority version such that system data of the production system is not altered.

13. The computer-implemented method as recited in claim 6, wherein the generating the result based on the comparison of the at least one candidate response to the at least one authority response identifies differences specified as being unacceptable to the operation of the candidate version of the software.

14. The computer-implemented method as recited in claim 13, further comprising identifying one or more code changes between the candidate version and a version of the software prior to the candidate version that resulted in the identified differences based at least in part on information from a source control system of the software.

15. The computer-implemented method as recited in claim 6, further comprising logging the at least one shadow request by storing the at least one shadow request in a searchable catalog organized in a hierarchical manner.

16. The computer-implemented method as recited in claim 6, wherein the generating the result based on the comparison of the at least one candidate response to the at least one authority response identifies unexpected differences and to suppress expected differences between the candidate response and authority response.

17. The computer-implemented method as recited in claim 6, further comprising:

receiving configuration information; and wherein at least one of the intercepting, requesting the candidate version to process the at least one shadow request, requesting the authority version to process the at least one shadow request, and the generating is based at least in part on the configuration information.

18. The computer-implemented method as recited in claim 6, wherein the candidate version is a modified version of the production version of the software and the authority version is the same version of the software as the production version.

19. One or more non-transitory computer-readable media storing computer-executable instructions that, when executed on one or more processors, perform acts comprising:

intercepting, in a non-blocking manner, at least one request to a production version of a software to generate at least one respective shadow request;

requesting a candidate version of the software to process the at least one shadow request, the candidate version of the software being a version of the software being validated;

requesting an authority version of the software to process the at least one shadow request, the authority version of the software being a version of the software that is used for validating the candidate version of the software;

receiving, in response to processing the at least one shadow request, at least one candidate response from the candidate version and at least one respective authority response from the authority version; and generating a result based on a comparison between the at least one candidate response with the at least one respective authority response.

20. The one or more non-transitory computer-readable media as recited in claim 19, wherein the acts further comprise determining at least a latency difference between the candidate version and the authority version based at least in part on the received at least one candidate response and the at least one authority response.

21. The one or more non-transitory computer-readable media as recited in claim 20, wherein the acts further comprise:

triggering a notification if at least one of the latency difference or the result of the generating fails to meet at least one condition; or triggering an automatic rollback of the candidate version to a version of the software prior to the candidate version if at least one of the latency difference or a result of the generating fails to meet at least one condition.

22. The one or more non-transitory computer-readable media as recited in claim 19, wherein the acts further comprise:

determining at least one use-case of the software exercised by at least one intercepted requests;

determining a mix of use-cases of the software exercised by the intercepted requests; and wherein the intercepting is performed at least until one or more conditions regarding the mix of use-cases of the software exercised by the intercepted requests are satisfied.

23. The one or more non-transitory computer-readable media as recited in claim 19, wherein the acts further comprise:

determining at least a code coverage of the software of the at least one intercepted requests;

determining an aggregate code coverage of the software of the at least one intercepted requests; and wherein the intercepting is performed until one or more conditions regarding the aggregate code coverage of the one or more of the requests are satisfied.

24. The one or more non-transitory computer-readable media as recited in claim 19, wherein the production version of the software modifies system data of a production system and the at least one shadow request is processed by the candidate version and the authority version such that system data of the production system is not altered.

25. The one or more non-transitory computer-readable media as recited in claim 19, wherein the generating the result based on the comparison of the at least one candidate response to the at least one authority response identifies differences specified as being unacceptable to the operation of the candidate version of the software.

26. The one or more non-transitory computer-readable media as recited in claim 19, wherein the acts further comprise logging the at least one shadow request by storing the at least one shadow request in a searchable catalog organized in a hierarchical manner.

27. The one or more non-transitory computer-readable media as recited in claim 19, wherein the generating the result based on the comparison of the at least one candidate response to the at least one authority response identifies unexpected differences and to suppress expected differences between the candidate response and authority response.

28. The one or more non-transitory computer-readable media as recited in claim 19, wherein the candidate version is a modified version of the production version of the software and the authority version is the same version of the software as the production version.

* * * * *